(12) United States Patent
Clark et al.

(10) Patent No.: US 7,999,971 B2
(45) Date of Patent: Aug. 16, 2011

(54) OPTIMIZATION TECHNIQUES DURING PROCESSING OF PRINT JOBS

(75) Inventors: Raymond Edward Clark, Georgetown, KY (US); Ning Ren, Lexington, KY (US); Martin Geoffrey Rivers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 493 days.

(21) Appl. No.: 12/033,944

(22) Filed: Feb. 20, 2008

(65) Prior Publication Data
US 2008/0137119 A1    Jun. 12, 2008

Related U.S. Application Data

(63) Continuation of application No. 10/810,140, filed on Mar. 26, 2004, now Pat. No. 7,385,729.

(51) Int. Cl.
*H04N 1/40* (2006.01)

(52) U.S. Cl. .......................................... 358/1.9; 358/468

(58) Field of Classification Search .................. 358/1.9, 358/400, 500, 468, 504, 406; 382/276
See application file for complete search history.

(56) References Cited

U.S. PATENT DOCUMENTS

| | | | |
|---|---|---|---|
| 5,638,498 A | 6/1997 | Tyler et al. | |
| 5,805,174 A | 9/1998 | Ramchandran | |
| 6,466,229 B1 | 10/2002 | Nagao | |
| 6,535,293 B1 | 3/2003 | Mitsuhashi | |
| 6,616,359 B1 | 9/2003 | Nakagiri et al. | |
| 6,970,958 B2 | 11/2005 | Tohki | |
| 7,532,355 B2 | 5/2009 | Gauthier et al. | |
| 2001/0050781 A1 | 12/2001 | Kujirai | |
| 2005/0213117 A1 | 9/2005 | Clark et al. | |
| 2005/0213119 A1 | 9/2005 | Clark et al. | |
| 2005/0213130 A1 | 9/2005 | Bender et al. | |
| 2005/0213142 A1 | 9/2005 | Clark et al. | |
| 2005/0213143 A1 | 9/2005 | Cook et al. | |
| 2005/0213145 A1 | 9/2005 | Clark et al. | |
| 2008/0024810 A1 | 1/2008 | Clark et al. | |
| 2008/0137119 A1 | 6/2008 | Clark et al. | |
| 2009/0097067 A1 | 4/2009 | Cook et al. | |
| 2009/0109459 A1 | 4/2009 | Bender et al. | |

OTHER PUBLICATIONS

Non-Final Office Action for U.S. Appl. No. 10/983,390, U.S. Patent and Trademark Office, dated Mar. 4, 2009.
Notice of Allowance for U.S. Appl. No. 10/810,140, U.S. Patent and Trademark office, dated Mar. 21, 2008.
Non-Final Office Action for U.S. Appl. No. 10/983,952, U.S. Patent and Trademark Office, dated Feb. 5, 2009.
Notice of Allowance for U.S. Appl. No. 10/810,004, U.S. Patent and Trademark Office, dated Dec. 8, 2009.
Non-Final Office Action for U.S. Appl. No. 10/810,143, U.S. Patent and Trademark Office, dated Nov. 30, 2009.
Final Office Action for U.S. Appl. No. 10/983,826, U.S. Patent and Trademark Office, dated Jan. 14, 2010.

*Primary Examiner* — Thomas D Lee
*Assistant Examiner* — Stephen M Brinich

(57) ABSTRACT

Methods for processing print jobs in rendering devices include constructing display list objects for to-be-printed objects and determining if two or more sequential objects are combinable. If so, a masked indexed image replaces the objects and has dimensions matching the overall bounding box size of the combinable objects. Indexed image values of the masked indexed image correspond to look up table entries, in turn, corresponding to color values of pixels of the combined object. In this manner, memory space is made available. Determining combinability of objects occurs by examining whether the objects are opaque, have regions as stencils, have similar color intensities, have the same halftone screens, share comparably sized or proximate bounding boxes or for other reasons. Head and tail pointers delineate sequential objects on the display list. The masked indexed image can be uni- or multi-dimensional. Computer readable media and graphics engines in printers are preferred implementation structures.

22 Claims, 19 Drawing Sheets

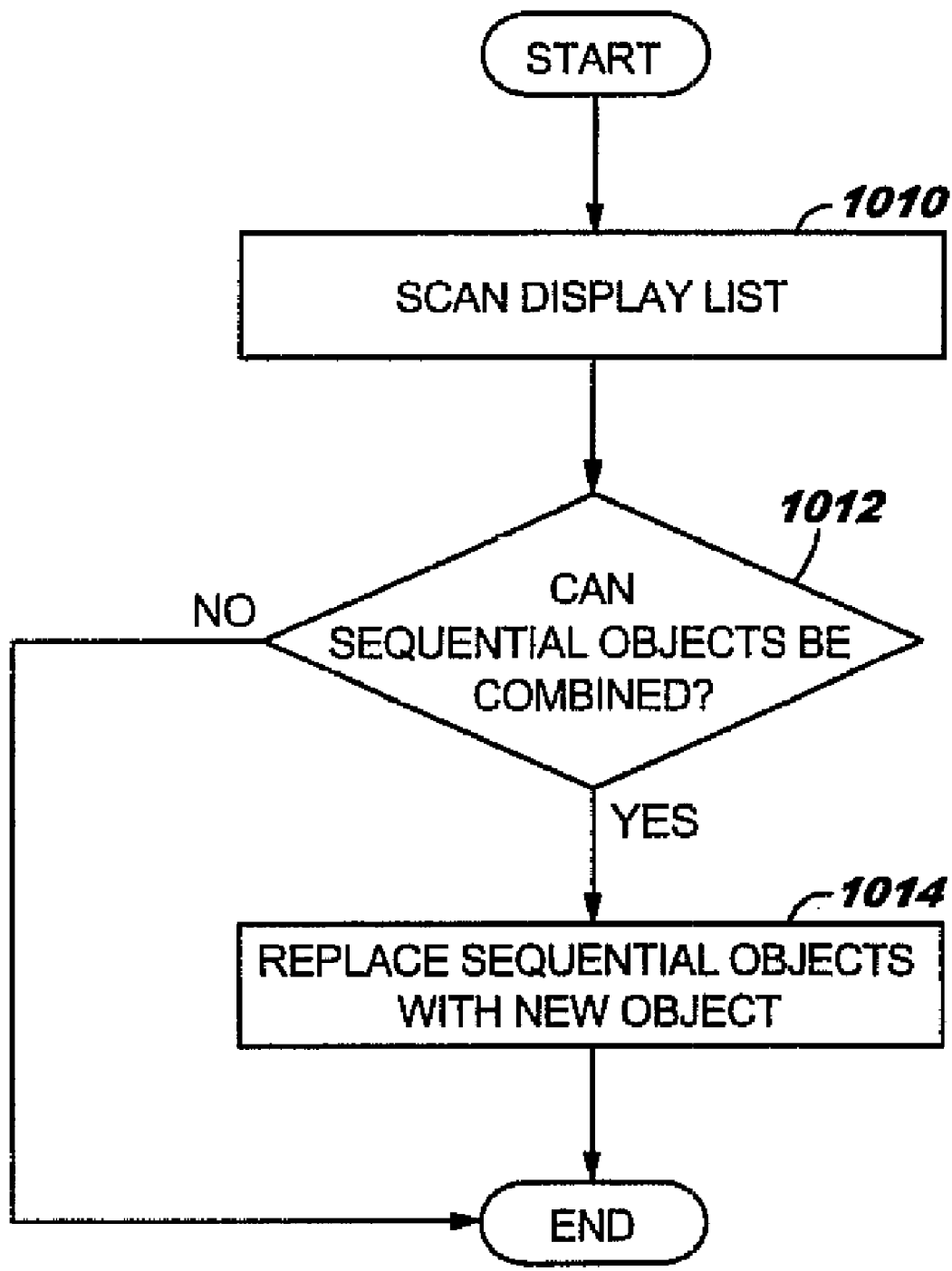

FIG. 11A
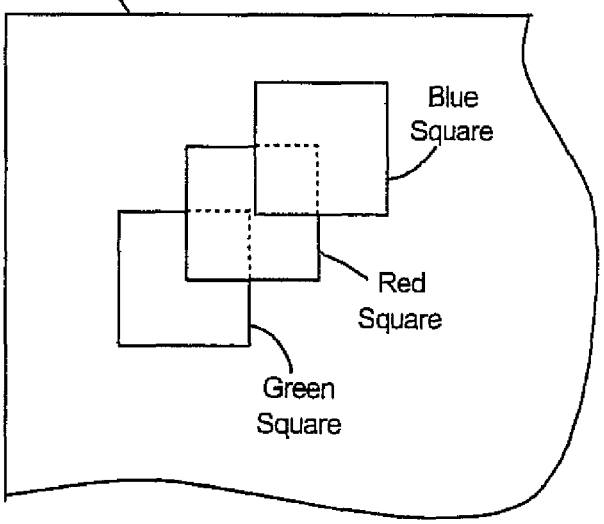
FIG. 11B
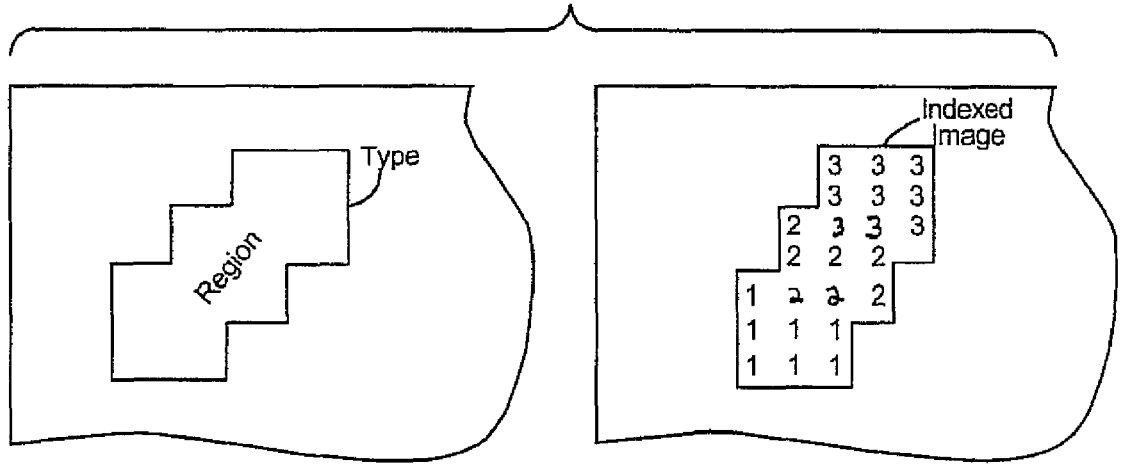
FIG. 11C

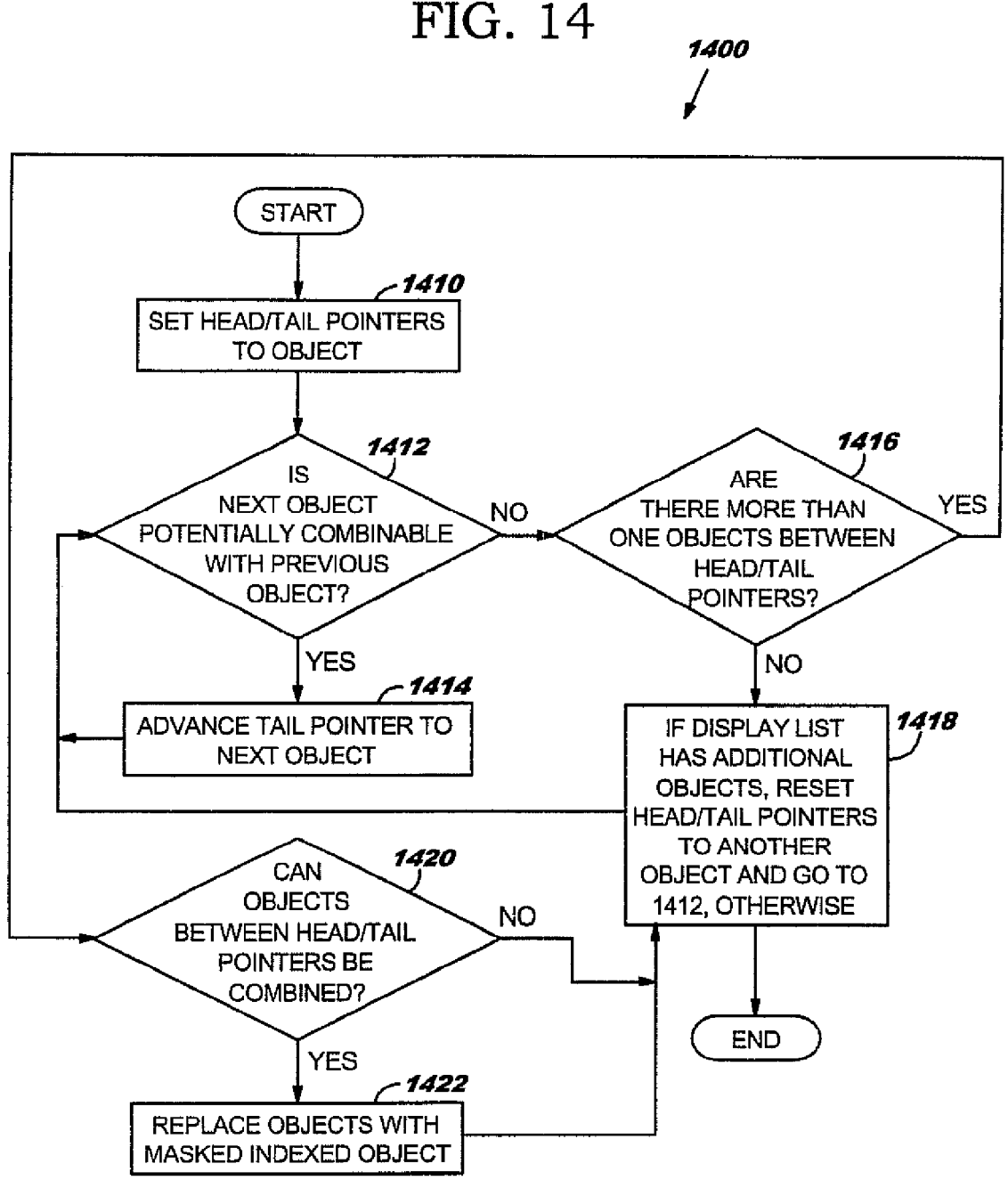

FIG. 16A
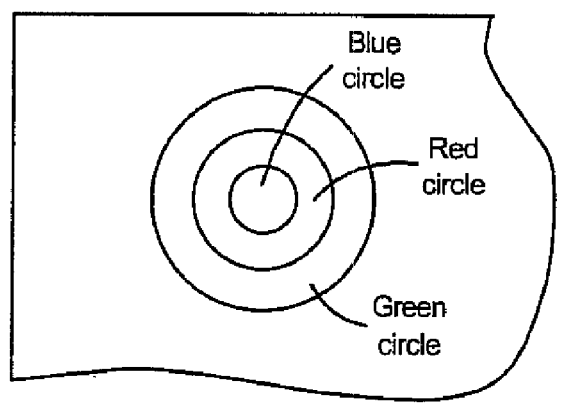
FIG. 16B
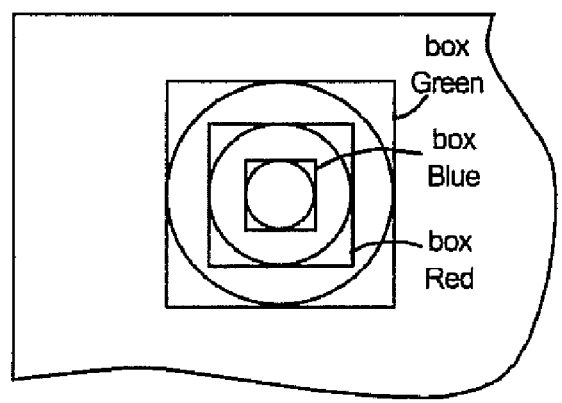
FIG. 16C
```
                    box new
0 0 1 1 1 0 0
0 1 1 1 1 1 0
1 1 2 2 2 1 1
1 1 2 3 2 1 1
1 1 2 2 2 1 1
0 1 1 1 1 1 0
0 0 1 1 1 0 0
```

OPTIMIZATION TECHNIQUES DURING PROCESSING OF PRINT JOBS

This application claims priority and benefit as a continuation application of U.S. application Ser. No. 10/810,140 filed on Mar. 26, 2004, now U.S. Pat. No. 7,385,729 entitled "Optimization Techniques During Processing of Print Jobs."

FIELD OF THE INVENTION

The present invention relates to achieving optimization during processing of print jobs in a rendering device, such as a printer. In one aspect, it relates to constructing display list objects, corresponding to the to-be-printed objects of the print job, and replacing pluralities of sequential objects with a single, new object to free memory space. In another aspect, it relates to constructing a masked indexed image for replacing the sequential objects.

BACKGROUND OF THE INVENTION

The art of printing with rendering devices, such as laser or other printers, is relatively well known. In general, printing results by creating a bitmap of the print job and sending the bitmap to appropriate printing mechanisms to obtain a hard copy output. During processing, some rendering devices create display lists to intermediately represent the to-be-printed objects. Appreciating that thousands of memory locations or more are required for this intermediate representation, rendering devices can mismanage their available memory which sometimes leads to print overruns. Moreover, memory mismanagement can slow the print job processing time. Accordingly, a need exists in the printing arts for achieving optimization in memory usage and processing time.

SUMMARY OF THE INVENTION

The above-mentioned and other problems become solved by applying the principles and teachings associated with the hereinafter described methods and apparatus for achieving optimization during processing of print jobs in rendering devices, such as printers. Methods for achieving optimization include constructing display list objects for to-be-printed objects and determining if two or more sequential objects are combinable. If so, a masked indexed image replaces the objects and has dimensions matching the overall bounding box size of the combinable objects. Indexed image values of the masked indexed image correspond to look up table entries, in turn, corresponding to color values of pixels of the combined object. In this manner, memory space is made available, while at the same time retaining the original color information of the to-be-printed objects, in case color blending is required with a subsequent to-be-printed object on the display list.

Preferably, determining combinability of objects occurs by examining whether the objects are opaque, have bounding boxes of a desirable size or proximity, have inks with limited numbers of colors, have regions with single colors, have similar color intensities and have the same halftone screens. Groups of combinable objects will also have overall bounding boxes of a desirable size and/or will have no more different colors than the maximum number of colors the index allows (e.g., if the index is eight bits, then no more than 256 unique colors are allowed; if the index is sixteen bits, then no more than 65536 unique colors; etc.). Head and tail pointers point out sequential objects on the display list having potential combinability. If combinable, the masked indexed image replaces the objects between the pointers. If not, the head and tail pointers are reset on other objects and combinability is reassessed. In one embodiment, the masked indexed image embodies multi- or uni-dimensional indexed images. If unidimensional, they also include an appropriate scalar value for accurately representing the entirety of the indexed image.

The display list aspect of the invention includes objects linked together in a variety of ways and a root precedes the objects. The root includes a flag for indicating, or not, a hard raster processing operation of one or more of the objects. After optimization, to-be-printed objects are rendered into device specific pages in memory. Rendering includes conversion of color values from a first color space specified by the PDL into a second color space of the rendering device and applying halftoning. Rendering can occur on a page-by-page basis of the print job or after all pages of the print job are received. The device specific pages include bitmaps ready for hand-off to an engine interface to invoke the print mechanisms of the printer.

Printer drivers for installation on host devices and graphics engines in laser printers are preferred structures for practicing the foregoing. To store information, both have dedicated memory or access to non-dedicated memory. The graphics engine embodiment preferably includes an interface with one or more PDL emulators dedicated to processing a particular language type, such as PCL, Postscript or the like. It also includes an interface with an engine interface and, when processing is complete, the graphics engine hands off a bitmap, in device specific colors and halftoned, to an engine interface to invoke the print mechanisms of a laser printer to produce a hard copy output. The printer driver embodiment preferably includes computer executable instructions on optical disks or other storage medium and/or can be downloaded from the internet, for example.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 10 is a flow chart in accordance with the teachings of the present invention for replacing combinable objects of a display list with new objects;

FIGS. 11A-11C are diagrammatic views in accordance with the teachings of the present invention of a new object for replacing combinable objects;

FIG. 14 is a flow chart in accordance with the teachings of the present invention of using head and tail pointers for replacing combinable objects of a display list with new objects;

FIGS. 16A-16C are diagrammatic views in accordance with the teachings of the present invention of an alternate embodiment of a bounding box implementation of the invention.

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized and that process, electrical, mechanical and/or software changes may be made without departing from the scope of the present invention. The following detailed description is, therefore, not to be taken in a limiting sense, and the scope of the present invention is defined only by the appended claims and their equivalents. In accordance with the present invention, methods and apparatus for achieving optimization during processing print jobs in a rendering device are hereinafter described.

Figure 1:
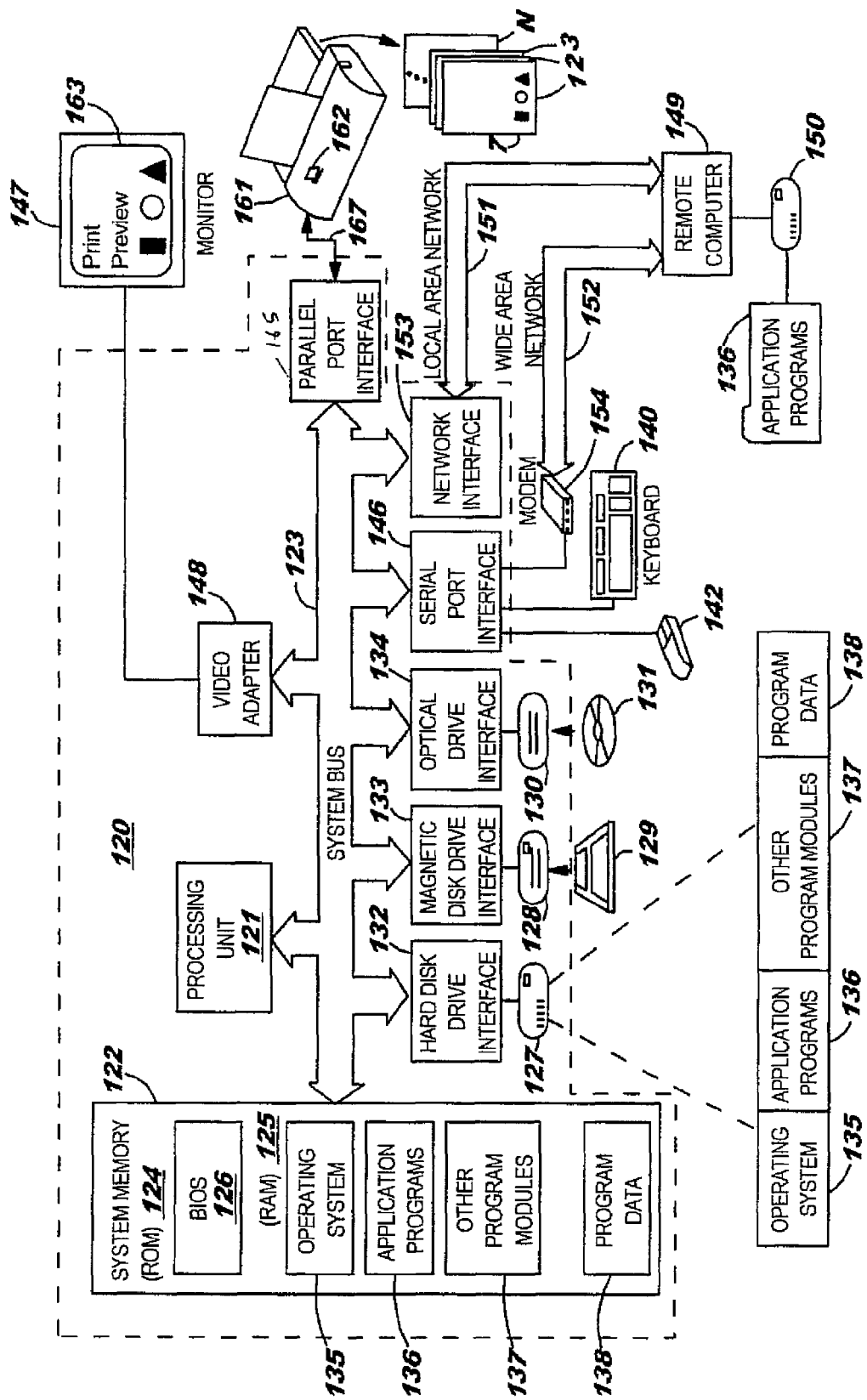
FIG. 1 is a diagrammatic view in accordance with the teachings of the present invention of a representative operating environment in which the invention may be practiced.

Appreciating users of the invention will likely accomplish some aspect of the methods in a computing system environment, FIG. 1 and the following discussion are intended to provide a brief, general description of a suitable computing environment in which either the structure or processing of embodiments may be implemented. Since the following may be computer implemented, particular embodiments may range from computer executable instructions as part of computer readable media to hardware used in any or all of the following depicted structures. Implementation may additionally be combinations of hardware and computer executable instructions. Further, implementation may occur in an environment not having the following computing system environment so the invention is only limited by the appended claims and their equivalents.

When described in the context of computer readable media having computer executable instructions stored thereon, it is denoted that the instructions include program modules, routines, programs, objects, components, data structures, patterns, trigger mechanisms, signal initiators, etc. that perform particular tasks or implement particular abstract data types upon or within various structures of the computing environment. Executable instructions exemplarily comprise instructions and data which cause a general purpose computer, special purpose computer, or special or general purpose processing device to perform a certain function or group of functions.

The computer readable media can be any available media which can be accessed by a general purpose or special purpose computer or device. By way of example, and not limitation, such computer readable media can comprise RAM, ROM, EEPROM, CD-ROM or other optical disk storage devices, magnetic disk storage devices or any other medium which can be used to store the desired executable instructions or data fields and which can then be accessed. Combinations of the above should also be included within the scope of the computer readable media. For brevity, computer readable media having computer executable instructions may sometimes be referred to as software or computer software.

With reference to FIG. 1, an exemplary system for implementing the invention includes a general purpose computing device in the form of a conventional computer 120. The computer 120 includes a processing unit 121, a system memory 122, and a system bus 123 that couples various system components including the system memory to the processing unit 121. The system bus 123 may be any of the several types of bus structures including a memory bus or memory controller, a peripheral bus, and a local bus using any of a variety of bus architectures. The system memory includes read only memory (ROM) 124 and a random access memory (RAM) 125. A basic input/output system (BIOS) 126, containing the basic routines that help to transfer information between elements within the computer 120, such as during start-up, may be stored in ROM 124. The computer 120 may also include a magnetic hard disk drive 127, a magnetic disk drive 128 for reading from and writing to removable magnetic disk 129, and an optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the computer 120.

Although the exemplary environment described herein employs a hard disk 127, a removable magnetic disk 129 and a removable optical disk 131, it should be appreciated by those skilled in the art that other types of computer readable media exist which can store data accessible by a computer, including magnetic cassettes, flash memory cards, digital video disks, removable disks, Bernoulli cartridges, random access memories (RAMs), read only memories (ROM), downloads from the internet and the like. Other storage devices are also contemplated as available to the exemplary computing system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general however, the various storage devices may be partitioned into two basic categories. The first category is local storage which contains information that is locally available to the computer system. The second category is remote storage which includes any type of storage device that contains information that is not locally available to a computer system. While the line between the two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk 127, magnetic disk 129, optical disk 131, ROM 124 or RAM 125, including but not limited to an operating system 135, one or more application programs 136, other program modules 137, and program data 138. Such application programs may include, but are not limited to, word processing programs, drawing programs, games, viewer modules, graphical user interfaces, image processing modules, intelligent systems modules or other known or hereinafter invented programs. A user enters commands and information into the computer 120 through input devices such as keyboard 140 and pointing device 142. Other input devices (not shown) may include a microphone, joy stick, game pad, satellite dish, scanner, camera, personal data assistant, or the like. These and other input devices are often connected to the processing unit 121 through a serial port interface 146 that couples directly to the system bus 123. It may also connect by other interfaces, such as parallel port, game port, firewire or a universal serial bus (USB).

A monitor 147 or other type of display device connects to the system bus 123 via an interface, such as a video adapter 148. In addition to the monitor, computers often include other peripheral output devices, such as speakers (not shown). Other output or rendering devices include printers, such as a laser printer 161, for producing hard copy outputs of sheets 1, 2, 3 . . . N of paper or other media, such as transparencies. In general, the hard copy output appears as a representation of what a user might view in a print preview screen 163 of an original program application displayed on the monitor. In this instance, the hard copy appears as three side-by-side objects, especially a red (interior-filled) vertically oriented rectangle, a green ring with a white interior and a blue (interior-filled) triangle, and all reside in a non-overlapping fashion near a bottom 7 of sheet 1. In one embodiment, the printer 161 connects to the computer or host device by direct connection to the system bus via a cable 167 attached to parallel port interface 165. In other embodiments, it connects via wires or wirelessly to the serial port interface, USB, Ethernet or other. Often times a driver, for installing necessary software on the computer 120 for the computer and printer to interface properly and to provide a suitable user interface with the printer via the monitor, becomes inserted as the optical disk 131, the magnetic disk 129 or can be downloaded via the internet or retrieved from another entity as a file. Some forms of the present invention contemplate the driver as storing computer executable instructions for executing the methods of the present invention.

During use, the computer 120 may operate in a networked environment using logical connections to one or more other computing configurations, such as a remote computer 149. Remote computer 149 may be a personal computer, a server, a router, a network PC, a peer device or other common network node, and typically includes many or all of the elements described above relative to the computer 120, although only a memory storage device 150 having application programs 136 has been illustrated. The logical connections between the computer 120 and the remote computer 149 include a local area network (LAN) 151 and/or a wide area network (WAN) 152 that are presented here by way of example and not limitation. Such networking environments are commonplace in offices with enterprise-wide computer networks, intranets and the Internet, but may also be adapted for use in a mobile environment at multiple fixed or changing locations.

When used in a LAN networking environment, the computer 120 is connected to the local area network 151 through a network interface or adapter 153. When used in a WAN networking environment, the computer 120 typically includes a modem 154, T1 line, satellite or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the local or remote memory storage devices and may be linked to various processing devices for performing certain tasks. It will be appreciated that the network connections shown are exemplary and other means of establishing a communications link between the computers may be used. Moreover, those skilled in the art will appreciate that the invention may be practiced with other computer system configurations, including host devices in the form of hand-held devices, multi-processor systems, microprocessor-based or programmable consumer electronics, network PCs, minicomputers, computer clusters, main frame computers, and the like.

Figure 2:
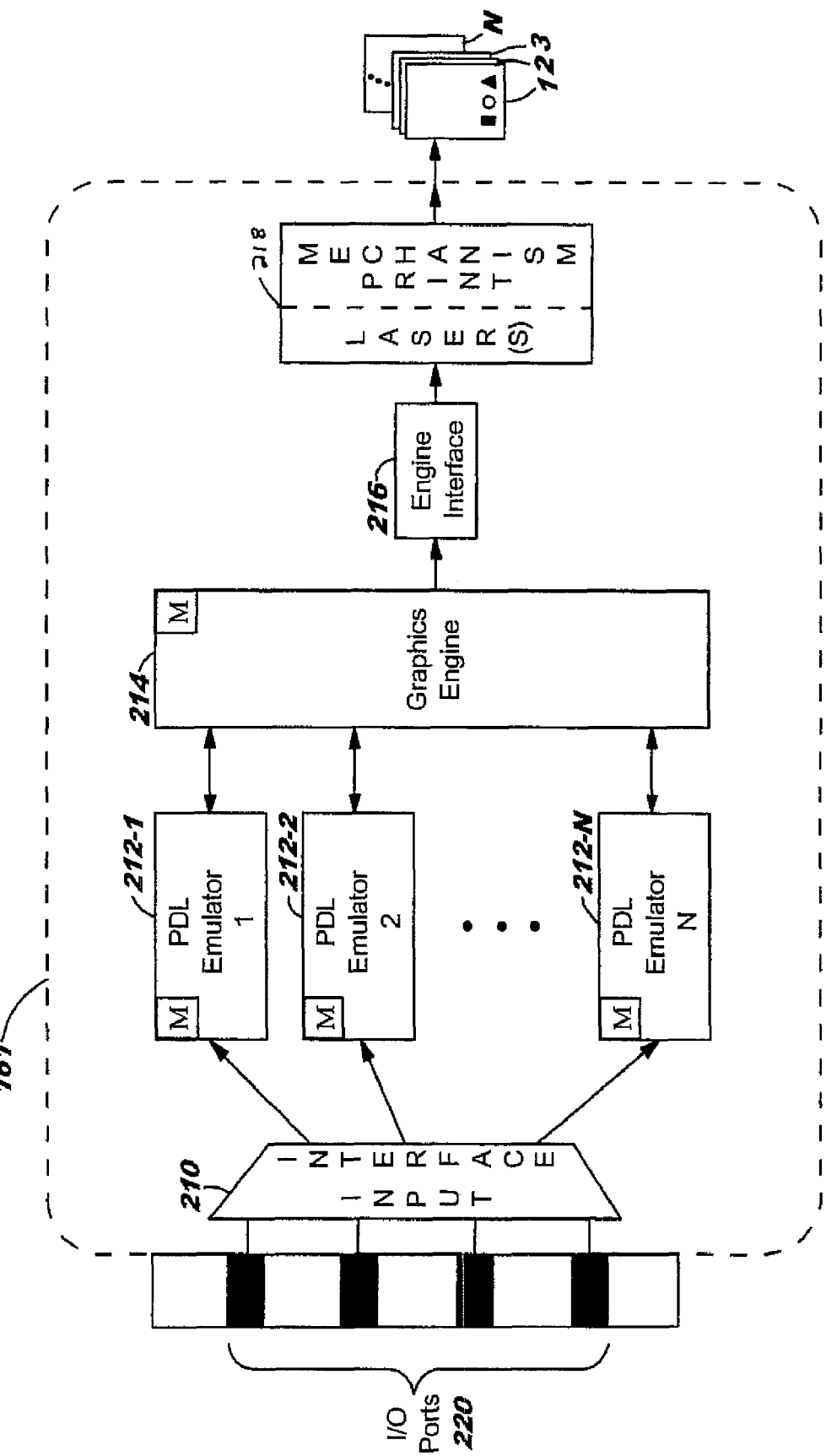
FIG. 2 is a diagrammatic view in accordance with the teachings of the present invention of a rendering device in the form of a laser printer.

With reference to FIG. 2, the rendering device or printer 161 of FIG. 1 is described in more detail. In one embodiment, the printer includes the following functional blocks: an input interface 210; pluralities of printer description language (PDL) emulators 212-1, 212-2 . . . 212-N; a graphics engine 214; an engine interface 216; and print mechanisms 218, including one or more lasers. Of course, the printer has other well known functional components (not shown) to effectuate printing of sheets 1, 2, 3 . . . N, of a print job including a controller often embodied as an ASIC or microprocessor, system memory, buffers, memory card slots/readers, a user-input control panel with discrete buttons and/or software, and the like. Some of these other components may actually be the source of a given print job. The printer connects to the computer 120 (FIG. 1) via IR, wirelessly or a cable connected to one of its many input/output (I/O) ports 220. Representative I/O ports include a parallel port, a serial port, a USB port, or a network port, such as Ethernet, LAN, WAN or the like. In addition to or in substitution for the computer 120, the printer can also interface with other host devices. For example, it may interface directly with a digital camera, a personal data assistant, an optical code reader, a scanner, a memory card, or other known or hereafter developed software or apparatus.

During use, as is known, when the host or other device has a print job ready for printing, the host sends data to the printer in a form ready for processing by the printer. Often, this data embodies the well known form of a PDL. In general, PDL is a language (expression protocol) indicating which parts of a page contain text characters and which parts contain graphic images. It also has instructions on how to draw a to-be-printed object and its control therefor. It further includes a protocol for describing bitmap data. Some of the more well known forms of PDLs include Hewlett Packard's printer control language (PCL), PCLXL, Adobe's POSTSCRIPT, Canon's LIPS, IBM's PAGES and IPDS, to name a few. Yet, the printer may not know how many host or other devices are connected to it, on which I/O port(s) they may reside and in what form the PDL print job will arrive. Accordingly, the input interface 210 of the printer performs the following two well known functions. First, it assesses (by looping through the I/O ports) which, if any, of the I/O ports have a print job for the printer and, if a print job exists, locks onto such port. Second, it supplies the print job to the appropriate PDL emulator 212 in accordance with the PDL language type. As shown in FIG. 2, PDL emulators within the printer preferably exist as one emulator per one PDL language type (e.g., one PDL emulator 212-1 for PCL, one PDL emulator 212-2 for POSTSCRIPT, etc.). Downstream, the PDL emulator communicates/interfaces with the graphics engine 214. Generally speaking, the PDL emulator interfaces between the computer and the graphics engine to interpret the language of the PDL file, of any given print job, for the benefit of the graphics engine.

Figure 3A:
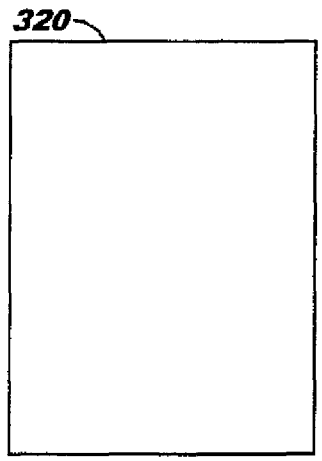
FIGS. 3A-3F are representative memory pages in accordance with the teachings of the present invention for producing a hard copy output.
Figure 3B:
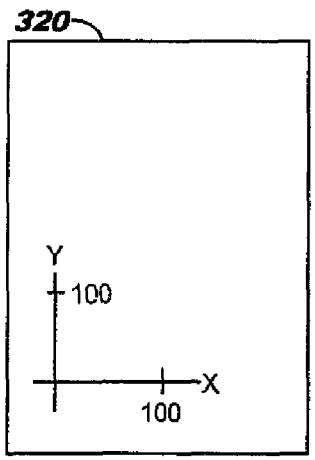
Figure 3C:
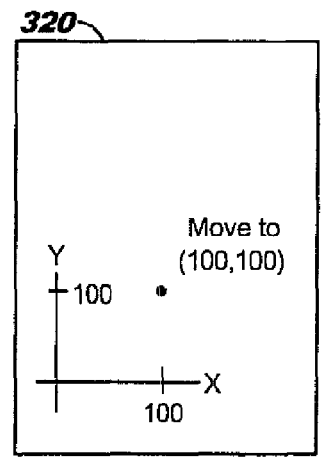
Figure 3D:
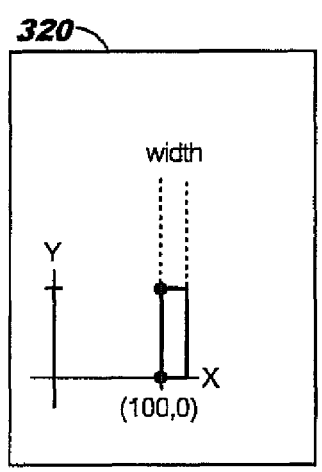
Figure 3E:
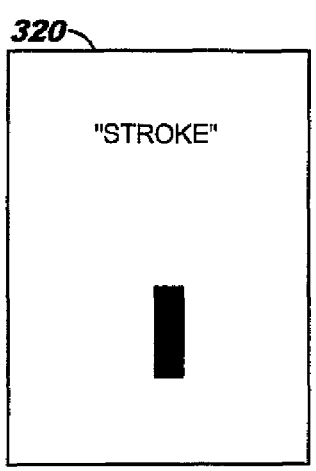
Figure 3F:
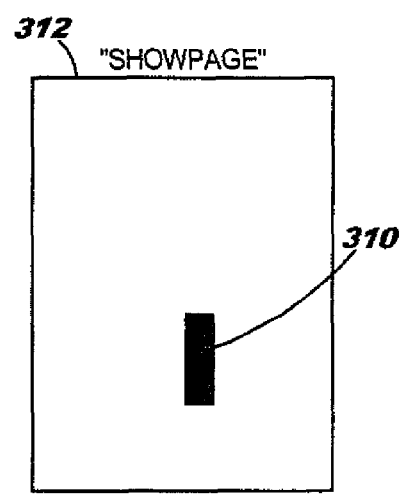

As an example, consider the following PDL file, embodied as an imaginary POSTSCRIPT file, having programming language tokens or command operations, as in Lines 1-6, for rudimentarily printing a thin black line 310 (FIG. 3F) near a bottom center of a to-be-printed page 312 to-be-output from a printer:

| 0 0 0 setrgbcolor | (Line 1) |
| 1 setlinewidth | (Line 2) |
| 100 100 moveto | (Line 3) |
| 100 0 lineto | (Line 4) |
| stroke | (Line 5) |
| showpage | (Line 6) |

As a preliminary matter, skilled artisans will appreciate the color (black) of the to-be-printed object (e.g., thin black line 310) first appears to the printer in a color space specified by the host or other device and it is incumbent upon the printer to convert such color space into whatever colors it functions in. In this instance, the color received by the printer corresponds to red, green, blue (r, g, b) color values which, in tarn, relate to the colors generated by the monitor 147 (FIG. 1). Many printers function in cyan (C), magenta (M) and yellow (Y) toners, or CMY and black (K), and the printer needs to eventually convert such r, g, b into CMYK.

Interpreting these lines of code, the color (black) of to-be-printed object (i.e., thin black line 310) has a red color in the computer color plane corresponding to a zero value (please appreciate this number ranges between a plurality of values that maps generally to 256 possible different color selections), a green color corresponding to a zero value and a blue color corresponding to a zero value, or black. The object has a linewidth value of 1 point ($\frac{1}{72}$", for example). With reference to FIGS. 3A-3E, the to-be-printed object begins in a page of virtual memory 320 at a coordinate value of 100, 100 (e.g., an x-y coordinate plane corresponding to an x-y plane of the to-be-printed page 312). Thereafter, the printer has a line (please appreciate a "line" with a line width of 1 point actually appears a stencil or a rectangular box as seen, greatly exaggerated, in FIG. 3D) drawn in memory from coordinate 100, 100 to the coordinate 100, 0. The operation command "stroke" tells the printer to now "paint" the line (e.g., fill in the stencil or rectangular box). Appreciating all this gets virtually performed in memory before actually printing an object on a piece of paper, the operation command "showpage" actually invokes the lasers, toner and paper pick of the printer to make the thin black line appear on the paper.

Regarding the interaction between the PDL emulator 212 and the graphics engine 214, it occurs in a well known iterative or back-and-forth manner. For example, the PDL emulator sequentially parses or processes a single command line of the above PDL file and relays it to the graphics engine. In response, the graphics engine returns information to the emulator notifying it of completion, for example, and then the PDL emulator goes and processes the next command line. The PDL emulator then communicates to the graphics engine about the next line of the PDL file, whereby the graphics engine responds, and so on until complete. In actuality, however, each individual command line need not require interaction with the graphics engine or any one single command line may invoke many interactions with the graphics engine and is well known in the art. To facilitate processing, each of the emulator and graphics engine have access to their own dedicated memory (M) for these and other purposes. In addition, during the "showpage" command operation, the 0,0,0 red, green, blue colors of the PDL file become converted into the CMYK toner colors of the rendering device printer. Preferably, the graphics engine performs this conversion and stores the printer colors in what artisans refer to as device specific colors or color planes. In this instance, since four colors exist in the printer (C, M, Y, K), the graphics engine stores four color planes. In mono printers, only one plane would exist. Skilled artisans also know color conversion from computers, or other hosts, into device specific colors occurs through well known processes often comprising specific entries in a look-up table and linear or other interpolation methods between the specific entries.

To actually invoke the lasers of the printer or other print mechanisms 218 (including, but not limited to, paper pick mechanisms, rollers, belts, photoconductive members, fusers, sheet feeders, toner cartridges, duplexers, and the like), the graphics engine 214 communicates directly with an engine interface 216. Preferably, the graphics engine supplies a bitmap rendered in device specific color and halftoned. The engine interface, in turn, supplies the requisite information, usually in the form of signals, to the print mechanisms to produce hard copy sheets 1, 2, 3 . . . N, for example.

Figure 4:
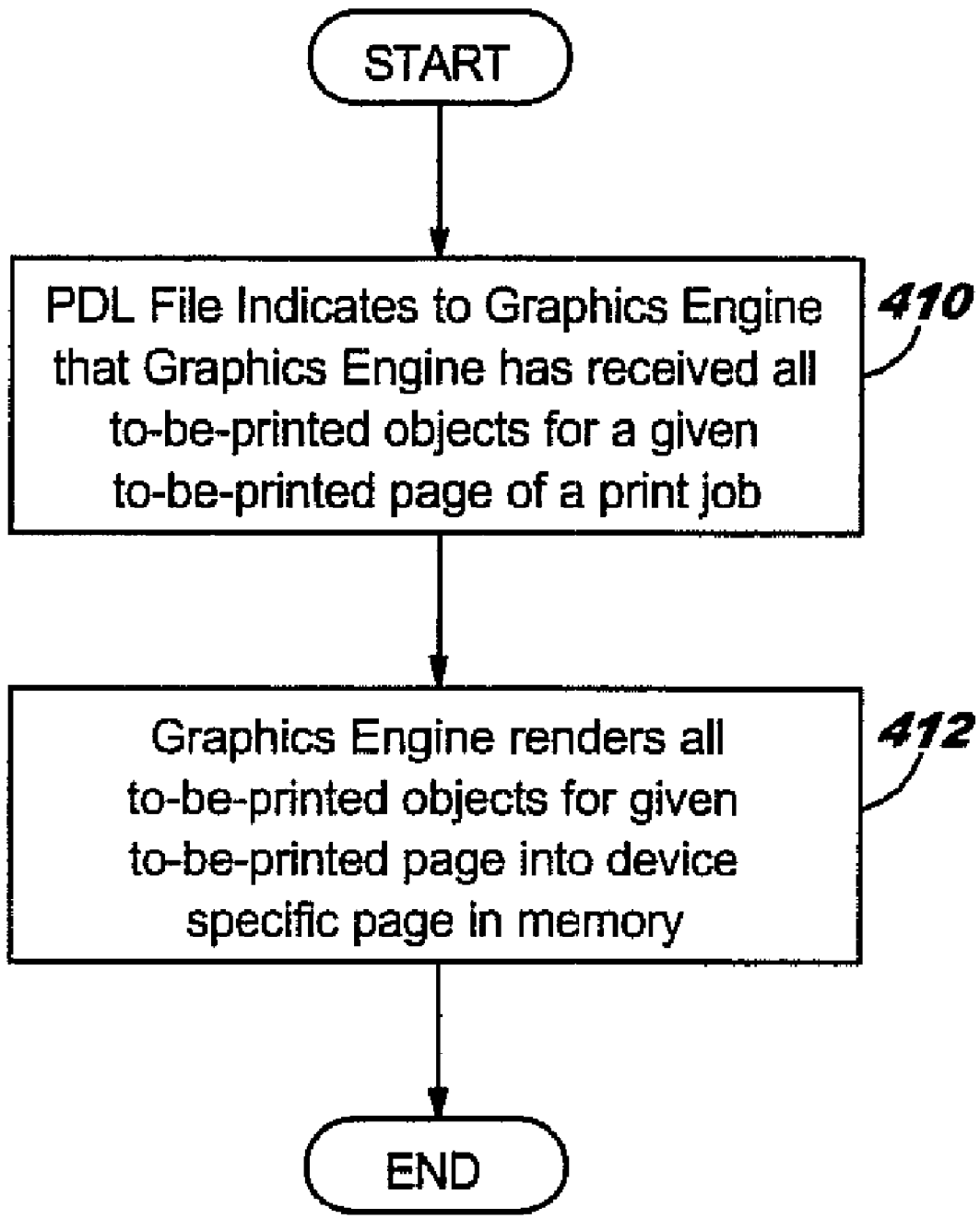
FIG. 4 is a flow chart in accordance with the teachings of the present invention indicating when the graphics engine preferably renders to-be-printed objects for a given to-be-printed page of a print job into device specific pages in memory.

For any given print job, the PDL file (through the PDL emulator) will eventually signal or indicate to the graphics engine that the graphics engine has been presented with or received all to-be-printed objects for a given page of a print job. In some instances, this occurs when the PDL emulator calls for the graphics engine to perform the "showpage" command. With reference to FIG. 4, this step 410 then invokes the graphics engine to render all the to-be-printed objects for that given page into a device specific page in memory, step 412. Preferably, this memory corresponds to the graphics engine dedicated memory M but may be any memory, local or remote, the graphics engine has access to. In an alternate embodiment, the rendering of the to-be-printed objects into device specific pages of memory occurs at the completion of receipt of more than one to-be-printed page of the print job or occurs before the completion of receipt of a single to-be-printed page.

The rendering of to-be-printed objects occurs, first, by having the graphics engine build, create or otherwise construct a display list having one or more to-be-printed objects for a given to-be-printed page. In essence, the display list comprises pluralities of data structures found in addresses or locations linked in memory that together describe a given to-be-printed object(s) and a to-be-printed page. A display list root begins the display list and points to the first object. The first object then points to the second object and so on until all objects are connected, in memory, for a given to-be-printed page of a print job. Preferably, all object(s) on the display list occur in the same exact order that the PDL file presented them to the graphics engine. Alternately, the display list order can be constructed to preserve the time domain order of color blending operations for each and every pixel on the to-be-printed page across all objects presented by the PDL.

Figure 5:
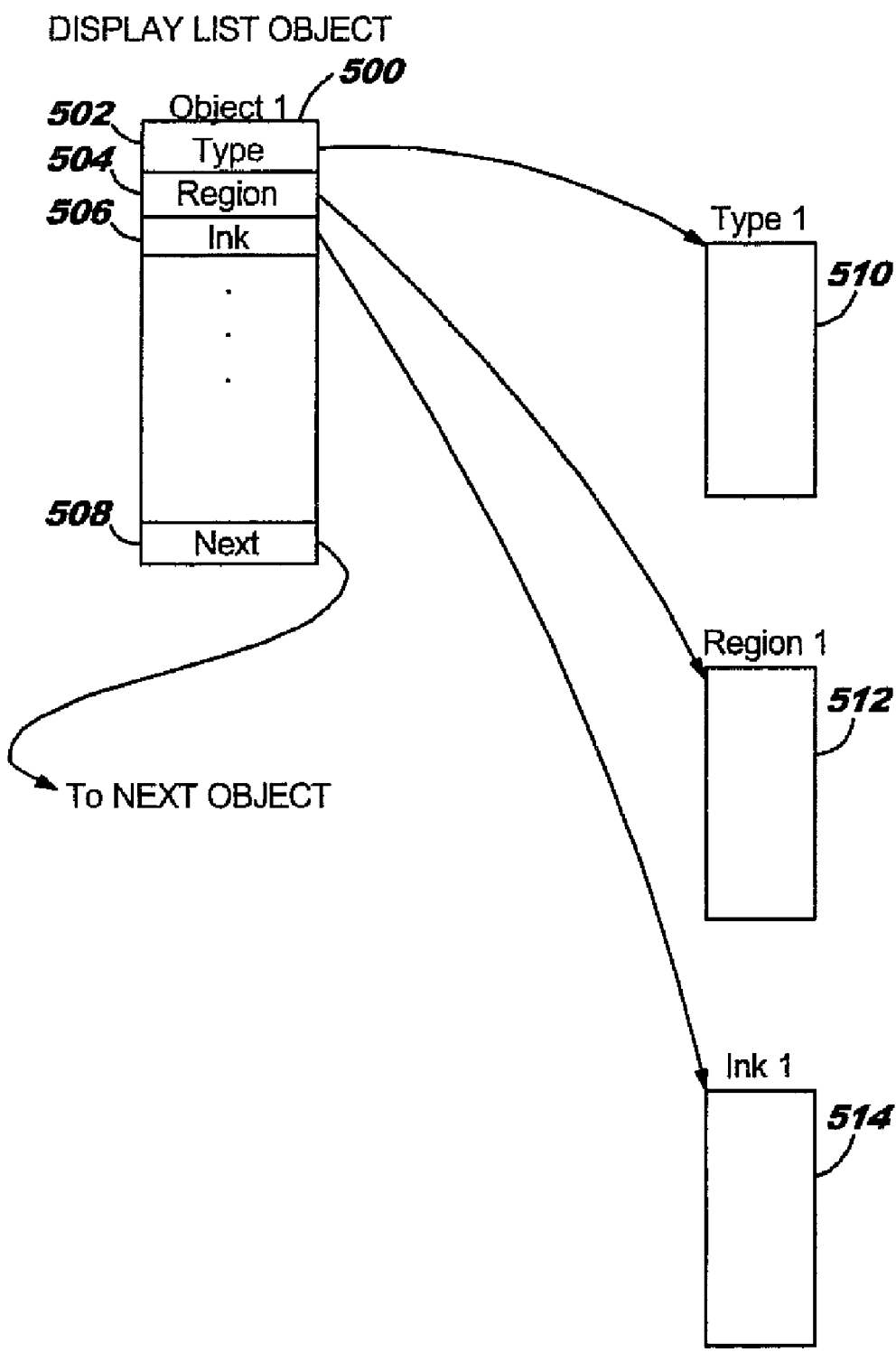
FIG. 5 is a diagrammatic view in accordance with the teachings of the present invention of a display list object.

In more specificity, FIG. 5, a display list object 500 for any given object preferably includes, but is not limited to, the attributes of object type 502, object region 504 and object ink 506. Attributes, as used herein, are typically presented to the graphics engine in accordance with the language type of the PDL. Attributes, however, may also be indirectly influenced by the printer or operator, via the driver or operator panel 162 on the printer 161, for example. A next pointer 508 is also included on the display list object 500 but does not substantively represent an attribute of the object. It merely points to the next object on the display list as will be described later in more detail. The attributes themselves point to specific other memory locations or addresses 510, 512, 514 that more particularly define the object type, the object region and the object ink, respectively.

Figure 6A:
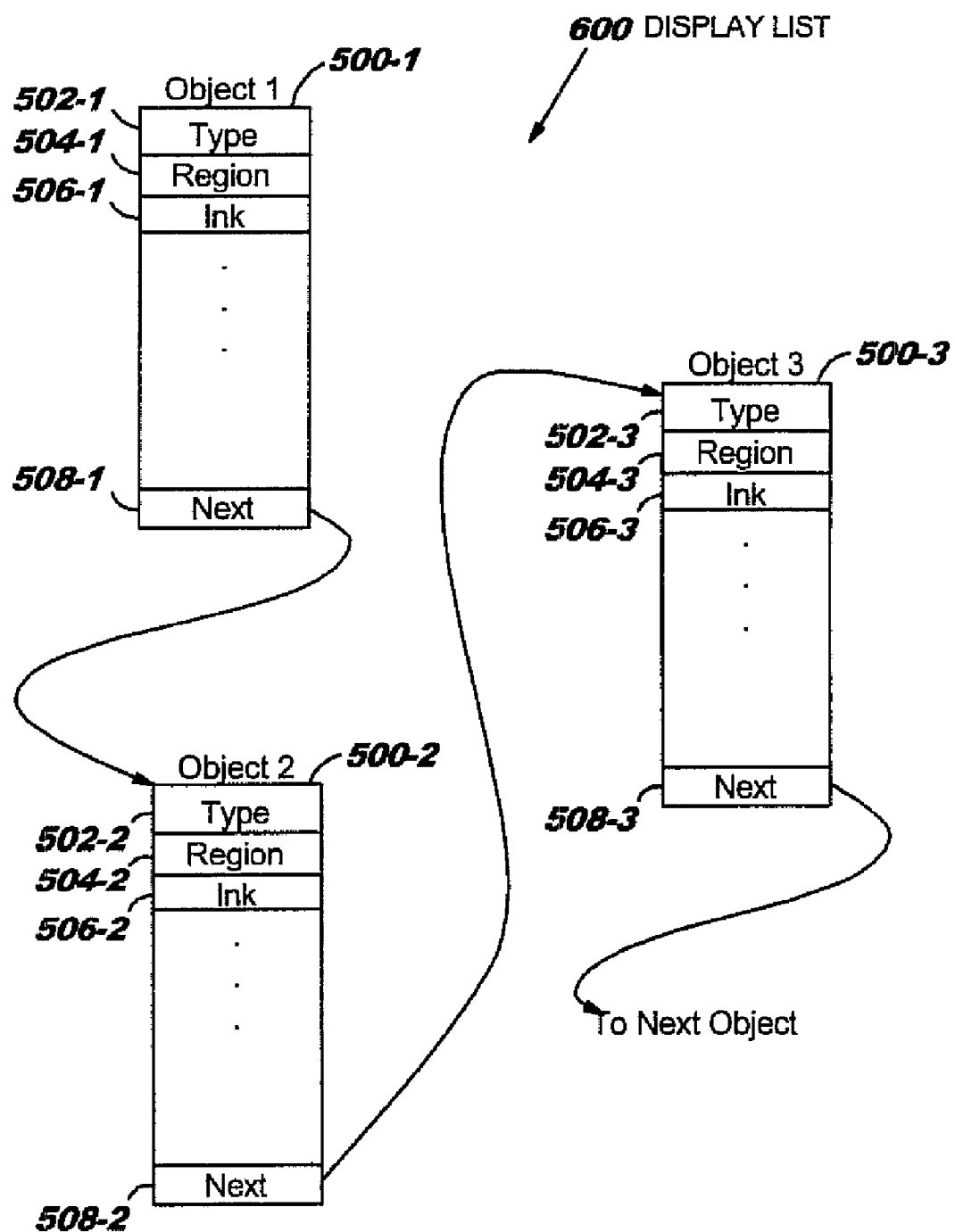
FIG. 6A is a diagrammatic view in accordance with the teachings of the present invention of a display list having pluralities of objects.
Figure 6B:
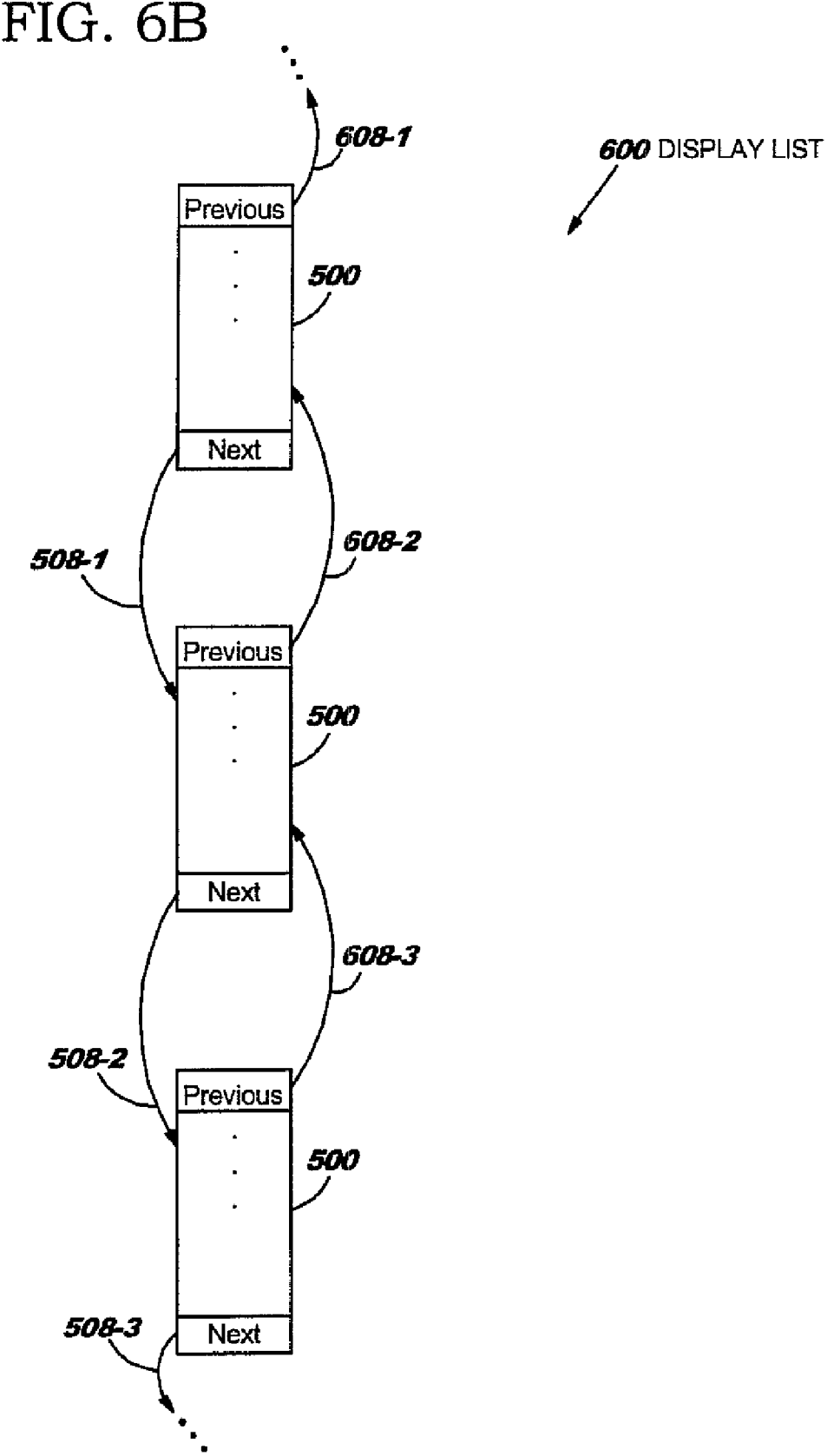
FIG. 6B is a diagrammatic view in accordance with the teachings of the present invention of an alternate embodiment of a display list having pluralities of objects.

In one embodiment, the object type attribute corresponds to whether the to-be-printed object is an image, such as a jpeg, a stencil, such as a rectangle, or a character (a, b, c . . . x, y, z, 0, 1, 2, . . . ). In other embodiments, it could correspond to a group of related objects. The object region attribute corresponds to the physical location of the to-be-printed object on the to-be-printed page and the geography of the object type, such as the pixel dimensions of a rectangular stencil. It may also include information useful in processing the object such as a region bounding box. The object ink attribute corresponds generally to how to "paint" each pixel within the object region. With more specificity, the painting of each pixel means 1) what color to apply to each pixel for that to-be-printed object; and 2) how to apply pixel coloring in instances when pixels of multiple objects overlap one another on the to-be-printed page. In category 2), this typically includes a math or logic function specified, in a well known manner by the PDL as part of the PDL file, such as a Boolean expression, when the PDL emulator is of PCL language type, or an algebraic expression for PDF languages. As a representative example, a PCL language has 256 possible logic functions. A PDF language has about 16 math functions. Although shown in a given order on the display list object 500, the attributes may occur in any order desirable and the actual memory locations representing the attributes of the object need not be contiguous or sequential. With reference to FIG. 6A, a more comprehensive display list 600 is shown with pluralities of display list objects 500-1, 500-2, 500-3 linked together for a given to-be-printed page of a print job via the functionality of the next pointer 508-1, 508-2, 508-3 as previously discussed. In FIG. 6B, the objects (generically 500) of the display list 600 may alternatively be doubly linked via the functionality of both next and previous pointers 608-1, 608-2, 608-3, etc. In still other embodiments, the pointers need not point to immediately preceding or following objects and/or each object 500 may have pointers in addition to those shown. Of course, each object 500 still includes their other attributes and ellipses between the next and previous pointers indicate this feature.

Figure 7:
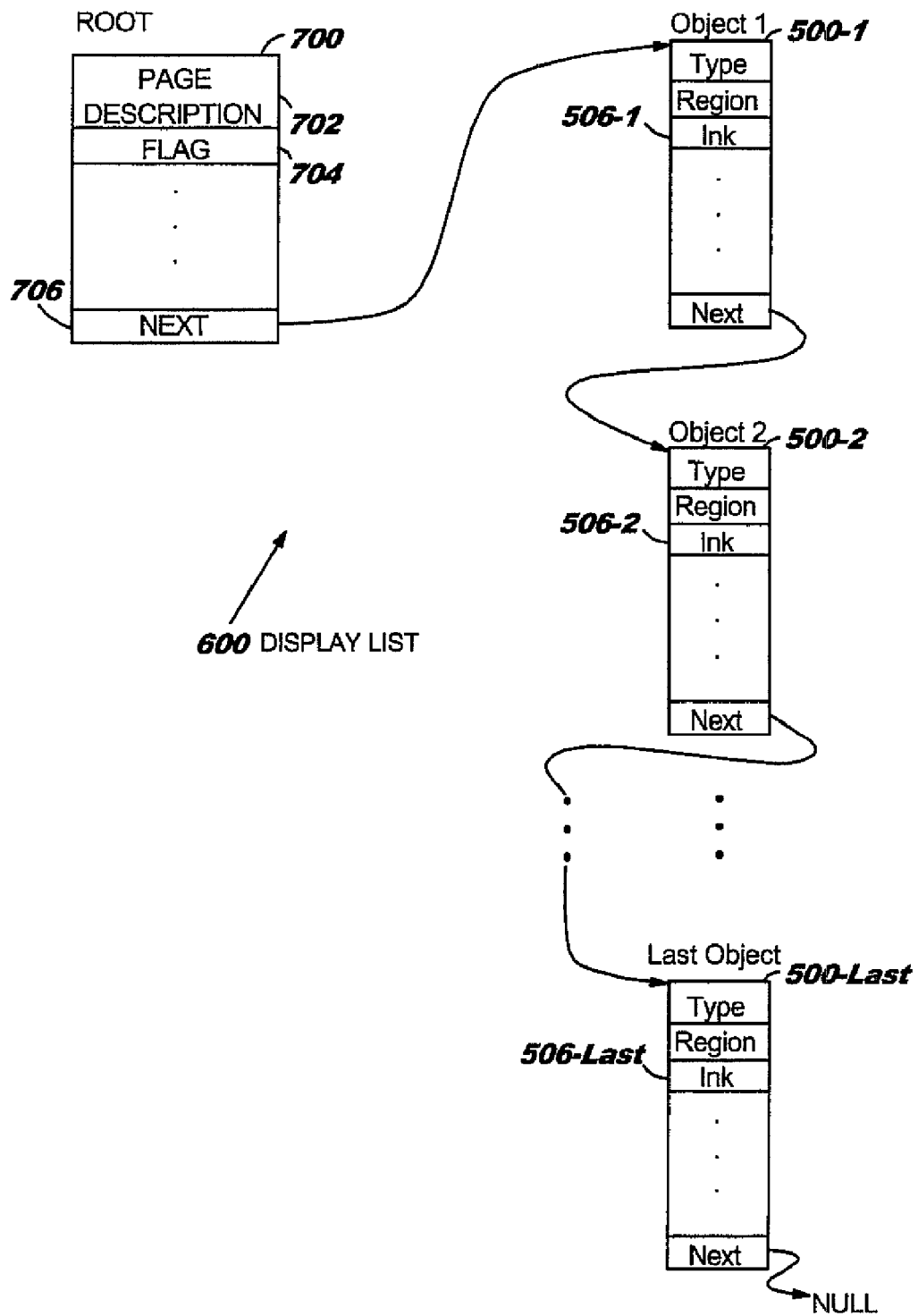
FIG. 7 is a diagrammatic view in accordance with the teachings of the present invention of a display list having pluralities of objects and a root.

With reference to FIG. 7, the display list 600 for a given to-be-printed page may also include a display list root 700 constructed by the graphics engine, and stored in memory, that precedes the first display list object 500-1 and points thereto. In general, the root describes the physical to-be-printed page and the virtual page in memory corresponding thereto. In one embodiment, the root 700 includes attributes for describing this, including a to-be-printed page description attribute 702 and a flag attribute 704. The page description 702 attribute includes information such as the size of the to-be-printed page (e.g., 8.5"×11", A4, etc.), page type (e.g., paper, transparency, glossy, etc.) and the like. It may also contain information specifying the color space in which to-be-printed objects will become blended. The flag 704 attribute, as will be described in more detail below, becomes set or not (e.g., on or off) for the entirety of the to-be-printed page to indicate whether any of the math or logic functions within the ink attributes 506-1, 506-2, 506-3, etc., of any of the display list objects 500-1, 500-2, 500-3, etc., include a difficult, complex or otherwise "hard" processing operation. If they do, the flag is set. If they do not, the flag is not set. As used herein, a hard processing operation means any math or logic function, previously described, having two or more inputs. Alternatively, the flag 704 attribute can become set or not for the entirety, or a partiality, of the to-be-printed page to indicate any other criterion or criteria such as the presence or absence, the on or off, or meeting of a condition, or not, in any of the display list objects 500. Still alternatively, the flag attribute may become set or not depending upon whether the math or logic function is a Boolean or an algebraic equation in accordance with the popular PCL or PDF languages. In addition, the condition may reside in an attribute of an object other than or in addition to the ink attribute 506. The condition may also appear in the display list root in addition to or in the absence of a condition appearing in one or more of the display list objects. As is described in more detail in the assignee's (Lexmark International, Inc.) co-pending application entitled "Processing Print Jobs," filed on Mar. 26, 2004, having Ser. No. 10/810,004, and incorporated herein by reference, downstream print job processing occurs down one processing route if the flag is set and down another processing route if the flag is not set. In general, downstream processing occurs more easily if the flag is not set.

Figure 8:
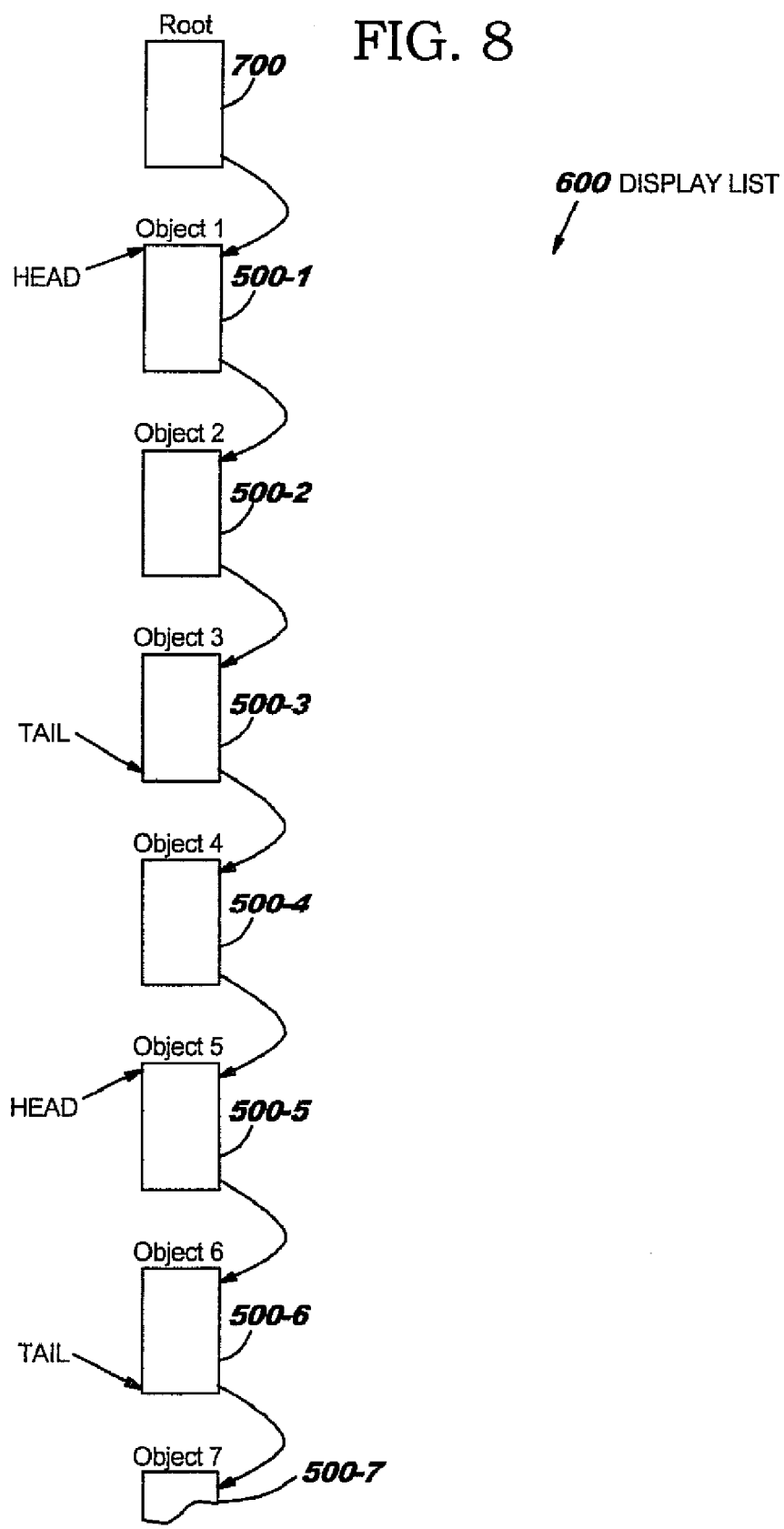
FIG. 8 is a diagrammatic view in accordance with the teachings of the present invention of a display list having head and tail pointers delineating combinable objects of the display list.
Figure 9:
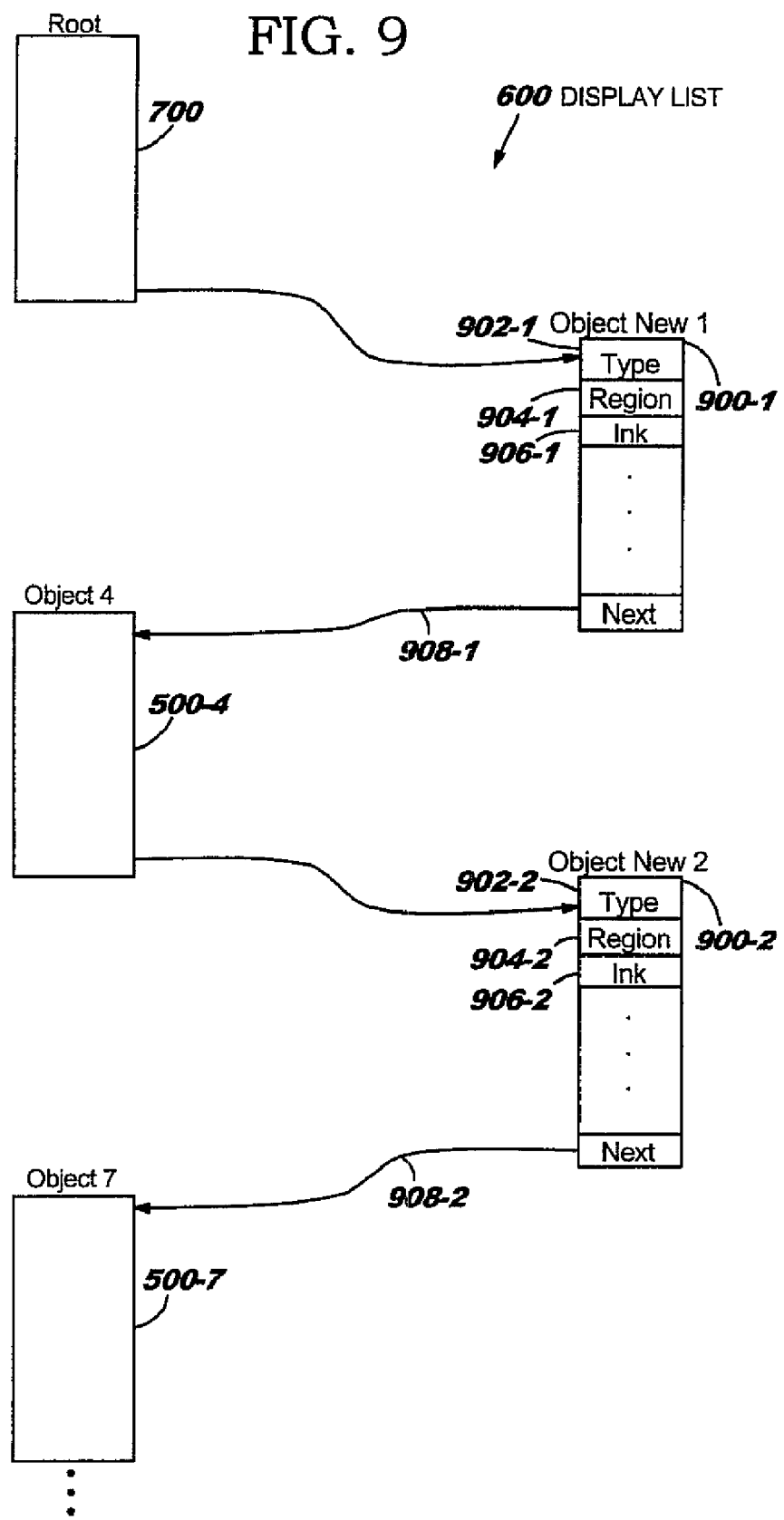
FIG. 9 is a diagrammatic view in accordance with the teachings of the present invention of a display list having new objects replacing combinable objects.

With reference to FIG. 8, the display list 600 of the invention further includes head and tail pointers that delineate sequential objects having potential combinability because of various attributes thereof. For example, if two or more sequential objects have type attributes of stencils (not including an image type attribute or a character type attribute), if their inks are all solid and opaque, if they have similar color intensities and if they all use the same halftone screens, then the objects have potential combinability. Additionally, if the objects have bounding boxes, described in more detail below, of a size less than a desirable threshold (especially less than about 512K bytes total) or have reasonable proximity on a to-be-printed page, or they have no more different colors than the maximum number of color the index allows (e.g., if the index is eight bits, then no more than 256 unique colors are allowed; if the index is sixteen bits, then no more than 65536 unique colors; etc.) they may also be combinable. As is known, the foregoing combinability factors describe well known attributes of color gradient or fountain-fill to-be-printed objects and the invention focuses on such factors when assessing combinability. However, the invention is not so limited to objects of these types and combinability of objects can be for the foregoing or other factors. Then, if combinable, a single, new object 900-1, 900-2 on the display list, as shown in FIG. 9, replaces the pluralities of objects delineated between the head and tail pointers of FIG. 8. In this manner, memory locations or addresses associated with the sequential display list objects (e.g., 500-1, 500-2, 500-3 and 500-5, 500-6, FIG. 8) can be freed for other uses as necessary.

A representative flow chart broadly illustrating this design is shown in FIG. 10. Specifically, at step 1010, the display list is scanned. Preferably, but not required, the graphics engine performs this step and does so concurrently with the construction of the display list or at some time after its completion. Then, in the event sequential display list objects can be combined, step 1012, they are replaced with a new object, step 1014, representing a merger of attributes of the combinable objects between the head and tail pointers. As seen in FIG. 9, the new object appears on the display list 600 and includes type attributes 902, region attributes 904 and ink attributes 906 having features previously described. They also have pointers 908 to indicate the next objects on the display list. Of course, a given display list can have pluralities of new objects as so indicated by object new 1 and object new 2.

In accordance with a more preferred embodiment of the invention, consider the working example of FIGS. 11A-11C. In FIG. 11A, two of three to-be-printed objects (green, red and blue squares) have portions overlying on other objects (e.g., blue square over red square over green square) on a to-be-printed page 1110 and have a corresponding place on a display list (not shown). Because these objects meet one or more of the previous combinability factors, they can be merged into a new object. Specifically, in FIG. 11B, they collectively become a new object having a stencil type attribute and a region type attribute as shown. The region type attribute of the new object merges the collective region attributes of the three to-be-printed objects and has the same boundary size thereof Within the region, indexed image values 1, 2, or 3, are positioned in the various pixel locations (greatly exaggerated) thereof. In turn, the values correspond to entries 1120 of a look up table (LUT), FIG. 11C, which store or indicate the actual color values of the merger of all the pixels of the to-be-printed objects combined together.

For example, the to-be-printed object green square originally has a color value of 0,1,0 (r, g, b) for each of its pixels, the red square originally has 1,0,0 (r, g, b) for each of its pixels while the blue square originally has 0,0,1 (r, g, b). Once merged together, the pixels of one to-be-printed object not obscured by overlying portions of other to-be-printed objects remain the color values originally presented. In this instance, this corresponds to the indexed image values of 1, 2 and 3 and corresponding LUT entries 1120-1, 1120-2, and 1120-3, respectively. As a result, instead of three individual objects being carried on a display list having individual type, region and ink attributes, a single, new object in the form of an indexed image takes their place and points to entries of a LUT. This saves on memory. Skilled artisans will appreciate that while three to-be-printed objects are shown merged into one new object, in practice tens, dozens, hundreds or more objects may become merged or replaced with a single, new object thereby saving even more memory than that illustrated.

Figure 17A:
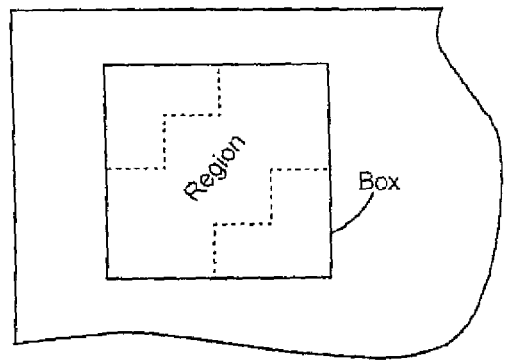
FIGS. 17A-17B are diagrammatic views in accordance with the teachings of the present invention of another alternate embodiment of a bounding box implementation of the invention.
Figure 17B:
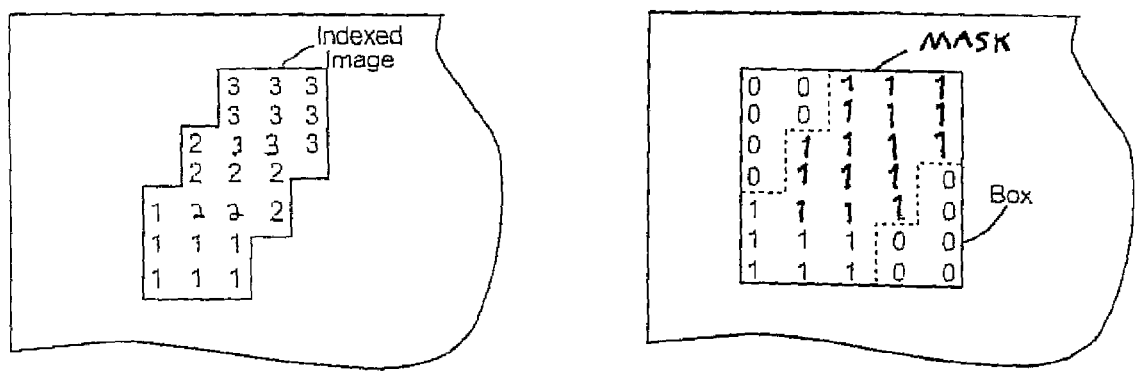

In FIGS. 17A-17B, and appreciating to-be-printed objects may have boundaries with tortuous boundary curves, the same can be accomplished with the assistance of a bounding box about the entirety of the to-be-printed objects (a dashed line is within the box in FIG. 17A to illustrate the merged region boundary of the three to-be-printed objects), and a mask plane, MASK, indicating what pixels within the bounding box have actually been touched or processed. The mask plane data for each pixel is typically represented as binary 1's and 0's, with 1's corresponding to pixels that have been touched and 0's for pixels that have not been touched. When this object is processed, pixels that were untouched should cause no modifications to those areas of the page they correspond to.

Figure 12A:
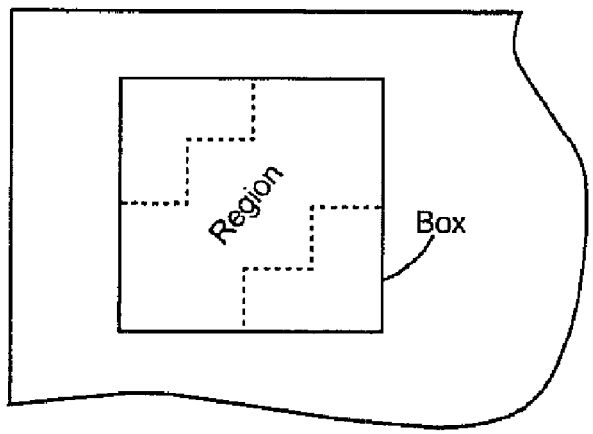
FIGS. 12A-12C are diagrammatic views in accordance with the teachings of the present invention of a bounding box implementation of the invention.
Figure 12B:
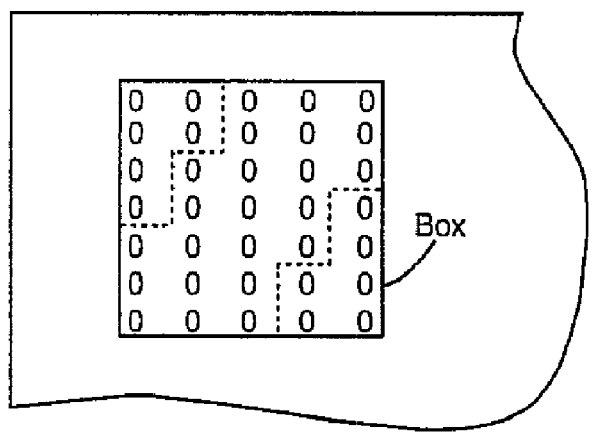
Figure 12C:
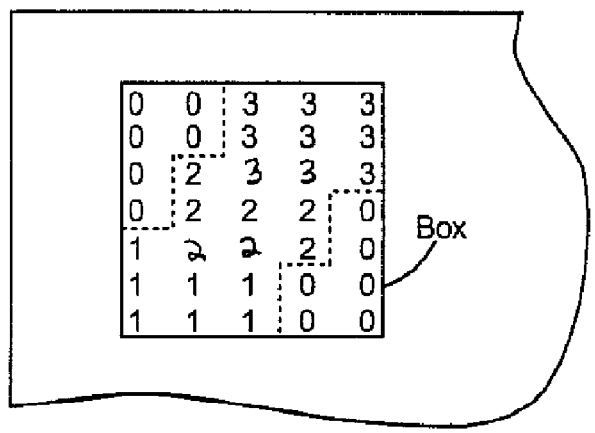

In FIGS. 12A-12C, an alternative to the creation of a mask plane is shown. In FIG. 12B, the indexed image values may all be initialized to a zero value or null set and, upon creation of a new object to replace the three to-be-printed objects, set to indexed image values 1, 2, or 3 as previously discussed. Then, any indexed image values remaining a zero, require no further processing or blitting. In this manner, a mask is created without requiring an entire data structure to hold it. It should be apparent to one skilled in the art that this form of a mask reduces the number of unique colors permitted in a combinable group to one less than the maximum number of colors the index allows (e.g., if the index is eight bits, then no more than 255 unique colors are allowed; if the index is sixteen bits, then no more than 65535 unique colors; etc.).

Another example of a bounding box to facilitate in this technique of optimization can be seen in FIGS. 16A-16C. In those figures, three to-be-printed objects in the form of a green, red and blue circle, all overlying one another, have corresponding objects placed on a display list (not shown). A unique bounding box surrounds each of the individual to-be-printed objects, especially a box green for the green circle, a box red for the red circle and a box blue for the blue circle. Upon creation of a new object for each of these three circles, an overall bounding box, box new, has indexed image values 0, 1, 2 or 3 for the colors. The indexed image value of 1 corresponds to a green color overlying an unaltered to-be-printed page, the value of 2 corresponds to a red color value while the value of 3 corresponds to a blue color value. A look up table (not shown) would have corresponding entries for these colors. As before, the value of 0 corresponds to no further processing or blitting. The size of the overall bounding box, box new, has the same size or dimensions as that of the box green because box green's dimensions match the bounding box of all three combined objects. Of course, skilled artisans can envision other to-be-printed object regions that could be optimized by the teachings herein.

Figure 13A:
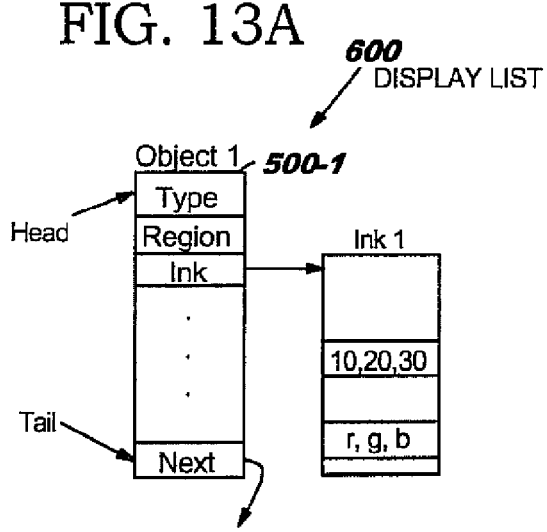
FIGS. 13A-13C are diagrammatic views in accordance with the teachings of the present invention of head and tail pointers used to isolate potentially combinable objects of a display list.
Figure 13B:
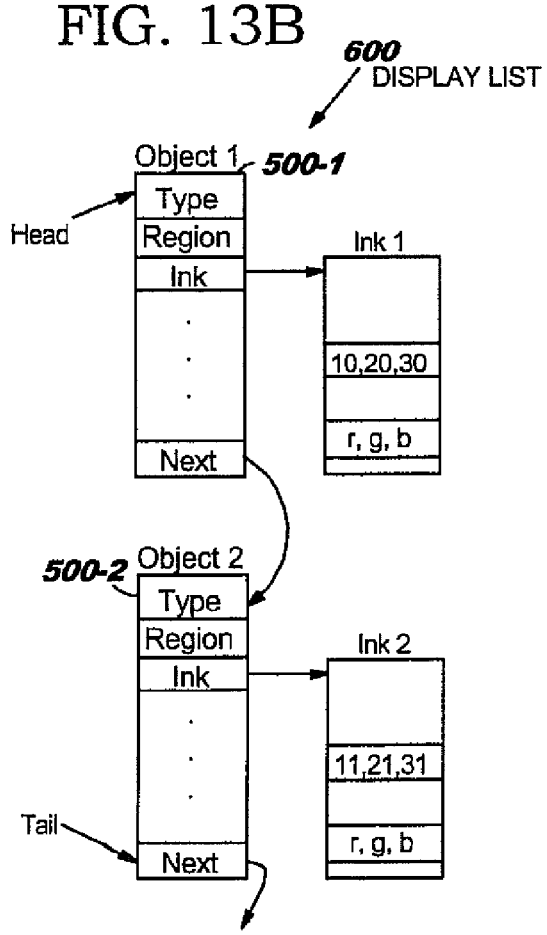
Figure 13C:
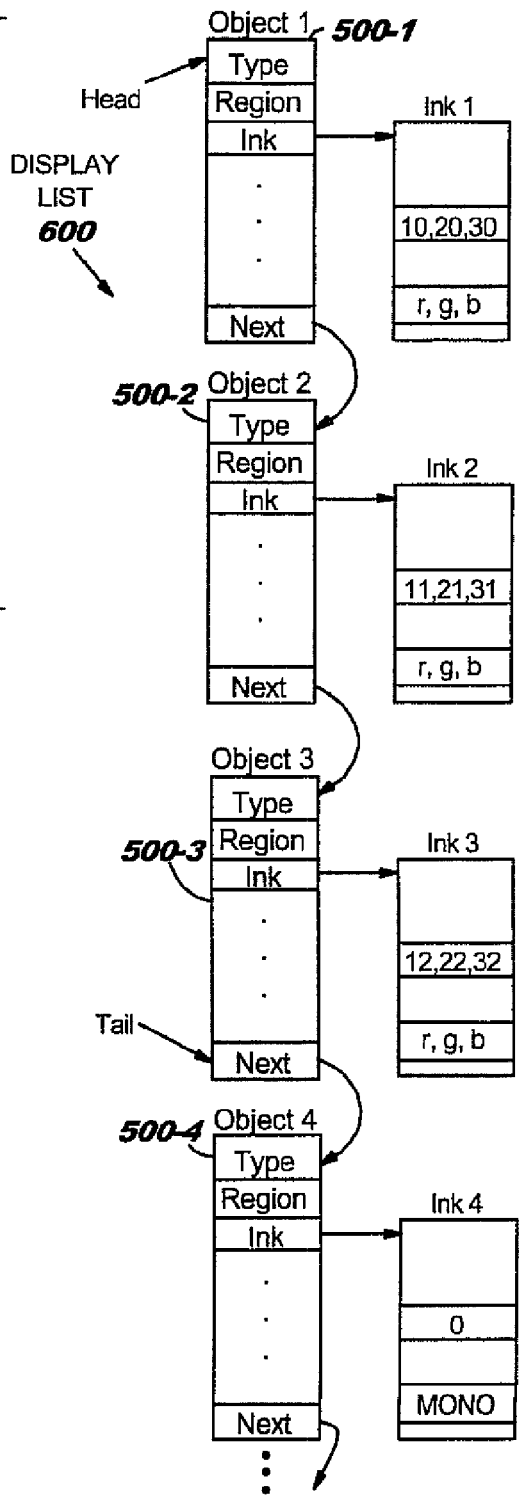

With reference to FIGS. 13A-13C, one preferred implementation of delineating potentially combinable objects on a display list occurs in accordance with the following example. In FIG. 13A, a first object 500-1 appears on a display list 600 and has ink attributes thereof with r, g, b color values of 10, 20, 30, respectively. A head and tail pointer are set to point at the object 500-1. In FIG. 13B, the display list has a sequentially placed second object, 500-2, having ink attribute r, g, b color values of 11, 21, 31, respectively. Because the color values or intensities have similarity in accordance with the previously mentioned combinability factors, the two objects are potentially combinable into a new object. Thus, the tail pointer is advanced to point at the second object 500-2 while the head pointer remains pointed at object 1, 500-1. In FIG. 13C, a third sequential object 500-3 on the display list has ink attribute r, g, b color values of 12, 22, 32, respectively. Because these color values also have similarity to the prior two objects, the tail pointer becomes advanced to point at the third object 500-3 while the head pointer remains pointed at the first object. In object 4, 500-4, however, the ink attributes have very dissimilar color values, namely a 0 mono value. Thus,. combinability is not readily accomplishable and the tail pointer remains pointed at the last object of the sequential group of objects, e.g., the third object, 500-3, having combinability. Thereafter, the first three objects of the display list 500-1, 500-2 and 500-3 are readily combined or merged into a new object that replaces them on the display list as previously described. An overall flow chart for describing this process is shown generally as 1400 in FIG. 14.

In particular, at step 1410, the head and tail pointers are set to point at a first object. At step 1412, if the next object on the display list is potentially combinable with the previous object, the tail pointer is advanced to the next object, step 1414. Thereafter, the process repeats until a future object is not combinable with the previous objects, such as in the case of object 4, 500-4 from FIG. 13C. In other embodiments, suitable tests for assessing the combinability between objects include tallying the number of objects between the head/tail pointers, estimating memory requirements for the objects between the head/tail pointers, determining whether available system memory falls beneath some acceptable threshold, combinations thereof or for other known or developed reasons. Continuing with the flow chart, at step 1416, if more than one object exists between the head and tail pointers (bearing in mind that only one object exists between the head and tail pointers if the next object on the display list has no potential combinability with the previous object), and if the objects between the head and tail pointers can be combined preferably according to the previously described factors), step 1420, the objects between the pointers are replaced with a masked indexed object, step 1422. Conversely, if the objects cannot be combined or the head and tail pointers point at the same object on the display list, the head and tail pointers are reset at step 1418 to point at another object on the display list and the process of assessing combinability of after-appearing objects on the display list repeats at step 1412. Step 1418, however, presumes such additional objects exist on the display list. Otherwise, the process 1400 ends.

Figure 15A:
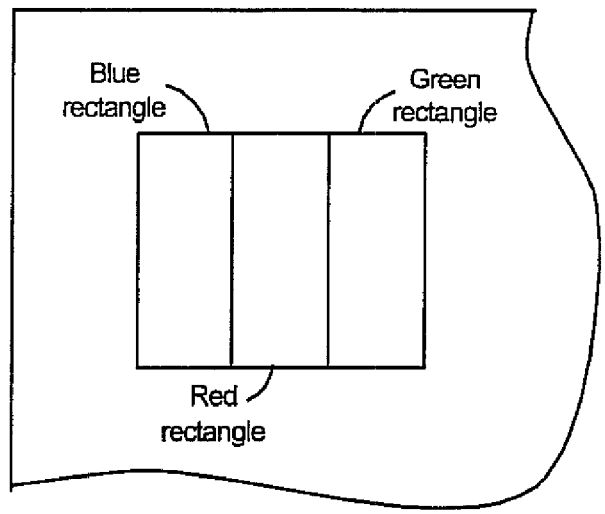
FIGS. 15A-15G are diagrammatic views in accordance with the teachings of the present invention of an alternate embodiment of a new object replacing combinable objects.
Figure 15B:
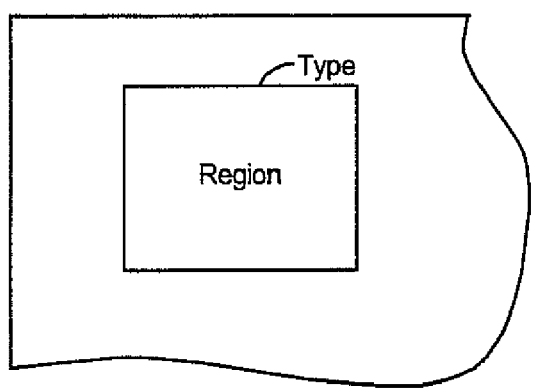
Figure 15C:
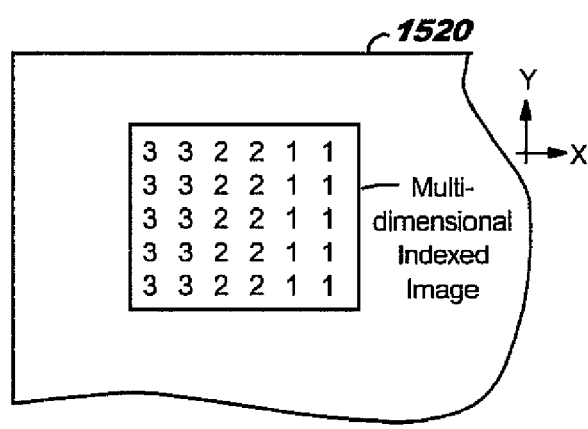
Figure 15D:
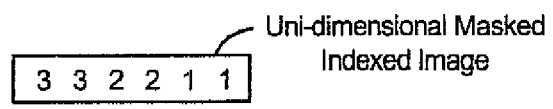
Figure 15E:
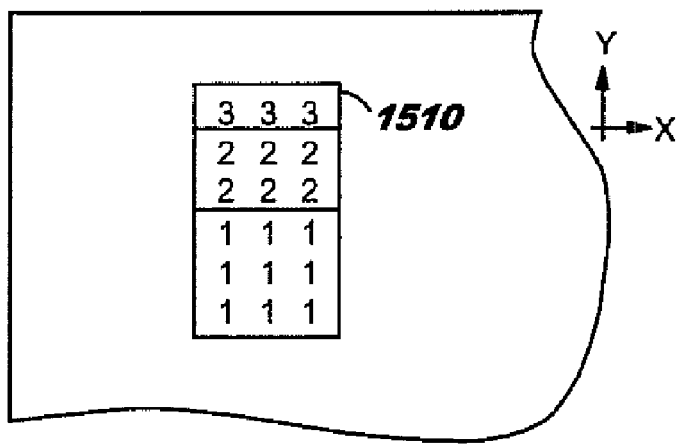
Figure 15F:
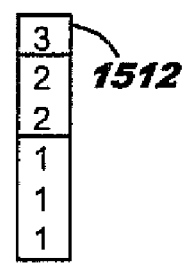
Figure 15G:
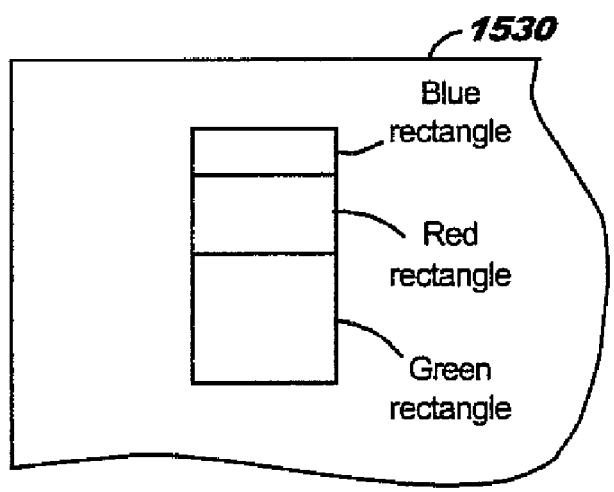

In an alternate embodiment of creating a masked indexed image to replace pluralities of combinable objects on a display list, consider the side-by-side overlapping to-be-printed blue, red and green rectangles of FIG. 15A. Appreciating that a new object for replacing these to-be-printed objects on a display list would have a stencil type attribute and a region attribute as shown in FIG. 15B, a masked indexed image would appear as shown in FIG. 15C. The indexed image values of 3, 2 and 1, in turn, would correspond to color values of blue, red and green, respectively. Since the masked indexed image is multidimensional, i.e., appearing in the x-y directions of a to-be-printed page 1520, and has commonality in its vertical y-direction, it can be converted into a uni-dimensional masked indexed image as shown in FIG. 15D. Then, to accurately reproduce the to-be-printed three rectangular objects (FIG. 15A), a scalar value of 5 would be applied in the vertical direction. Of course, this may also apply to other arrangements of multidimensional objects as shown in FIGS. 15E and F. In such instances, the multidimensional masked indexed image 1510 has a corresponding uni-dimensional masked indexed image 1512 and a scalar value of 3 in the horizontal x-direction to accurately represent the three to-be-printed objects, blue, red and green overlying rectangles, of FIG. 15G on a to-be-printed page 1530. Skilled artisans can contemplate still further embodiments.

Once the display list is complete, the graphics engine renders the to-be-printed objects into device specific pages in memory. In one embodiment, this includes the graphics engine ascertaining the object type attribute e.g., 502, 902, of the to-be-printed object; ascertaining the object region attribute e.g., 504, 904, and converting the color information, on a pixel-by-pixel basis for that to-be-printed object, into the device specific colors (e.g., CMYK) as previously described. Next, it performs well-known halftone operations for the to-be-printed object so it will appear properly to the human eye when viewed as a hard copy output. Next, the memory addresses or locations corresponding to that object, i.e., the display list object 500, 900, are released or freed so that the graphics engine or other structure can use them for future operations as necessary. If additional to-be-printed objects appear on the display list that require rendering, the graphics engine repeats the process until all to-be-printed objects are rendered in memory. At this point, the graphics engine can hand-off the bitmap, in device specific colors and halftoned, directly to the engine interface 216 (FIG. 2) to invoke the print mechanisms 218 of the printer 161 for producing a hard copy sheet. Of course, if additional to-be-printed pages, e.g., 2, 3 . . . N existed in a given print job, the graphics engine could wait until all to-be-printed pages became rendered before executing the hand-off.

In general, it is known to have either host based control of printing or to have device or printer based control of printing. Heretofore, printer based control has been exclusively described. In an alternate embodiment, however, the foregoing could be implemented through host-based control wherein the printer driver, installed on the host from some sort of software media, e.g., optical disk 131 (FIG. 1), alone or in combination with the computer 120, could perform the above-described processing through the implementation of computer-executable instructions on the driver or elsewhere. In still another embodiment, although the foregoing has been described in relationship to a laser printer, e.g., 161, no reason exists why this could not extend to inkjet printers, fax machines, copy machines, monitors, or other output-type rendering devices that provide output renditions for a given input.

The present invention has been particularly shown and described with respect to certain preferred embodiment(s). However, it will be readily apparent to those skilled in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed is:

1. A method for processing a print job, comprising:
constructing a display list with a plurality of to-be-printed objects being linked together on the display list;
determining at least one of whether said two or more sequential objects are opaque, whether said two or more sequential objects have regions in the form of a stencil, whether said two or more sequential objects have similar color intensities, and whether said two or more sequential objects have a same halftone screen; and
replacing two or more sequential said objects with a new object.

2. The method of claim 1, wherein said replacing further includes constructing a masked indexed image.

3. The method of claim 1, wherein the determining comprises determining whether said two or more sequential objects are opaque.

4. The method of claim 1, wherein the determining comprises determining whether said two or more sequential objects have regions in the form of a stencil.

5. The method of claim 4, further including determining whether said two or more sequential objects have a single color in said stencil.

6. The method of claim 1, wherein the determining comprises determining whether said two or more sequential objects have similar color intensities.

7. The method of claim 1, wherein the determining comprises determining whether said two or more sequential objects have a same halftone screen.

8. A printer driver having computer executable instructions stored on a non-transitory storage medium for performing the steps recited in claim 1.

9. A printer having a graphics engine with computer executable instructions stored in a memory accessible by the graphics engine for performing the steps recited in claim 1.

10. A method for processing a print job, comprising:
constructing a display list with a plurality of to-be-printed objects being linked together on the display list;
replacing two or more sequential said objects with a new object, wherein said replacing further includes constructing a masked indexed image; and
constructing a look up table corresponding to values of said masked indexed image.

11. A method for processing a print job, comprising:
constructing a display list with a plurality of to-be-printed objects, whereby a plurality of memory pointers link together said objects on the display list;
setting a head pointer to one of said objects and setting a tail pointer to another of said objects; and
replacing two or more sequential said objects with a new object.

12. The method of claim 11, further including determining whether two or more said objects between said head pointer and said tail pointer are combinable.

13. The method of claim 11, wherein said replacing further includes combining two or more said objects between said head pointer and said tail pointer.

14. A method for processing a print job, comprising:
constructing a display list with a plurality of to-be-printed objects being linked together on the display list, each said object having a corresponding memory space;
determining whether said objects are combinable; and
replacing two or more sequential said objects with a new object, thereby freeing at least one of said memory spaces, wherein said determining further includes setting a head pointer to one of said objects and setting a tail pointer to another of said objects.

15. The method of claim 14, wherein said replacing further includes freeing a memory location.

16. The method of claim 14, wherein said replacing further includes freeing a memory address.

17. The method of claim 14, wherein computer executable instructions perform said determining.

18. The method of claim 14, wherein a printer having a graphics engine with computer executable instructions stored in a memory accessible by the graphics engine performs said determining.

19. A method for processing a print job, comprising:
receiving a single, first print job, the print job being in a format of a page description language, the print job defining a plurality of to-be-printed objects that are to appear on a single to-be-printed page;
constructing a display list for the plurality of to-be-printed objects, the to-be-printed objects being linked together on the display list; and
replacing two or more sequential said to-be-printed objects in the display list with a single, new object.

20. The method of claim 19, wherein the replacing is automatic without a user selecting the replacing.

21. The method of claim 19, further comprising determining at least one of whether said two or more sequential objects are opaque, whether said two or more sequential objects have regions in the form of a stencil, whether said two or more sequential objects have similar color intensities, and whether said two or more sequential objects have a same halftone screen.

22. The method of claim 19, further comprising receiving a single, second print job, the second print job being in a format of a page description language and defining a plurality of to-be-printed objects that are to appear on a single, distinct to-be-printed page; constructing a second display list for the plurality of to-be-printed objects of the second print job, the to-be-printed objects of the second print job being linked together on the second display list; and replacing two or more sequential said to-be-printed objects of the second print job in the second display list with a single, new object, wherein the constructing and the replacing corresponding to the first print job is distinct and independent from the constructing and the replacing corresponding to the second print job.

* * * * *